Patented May 15, 1951

2,553,008

UNITED STATES PATENT OFFICE 2,553,008

PREPARATION OF UNSATURATED ORGANIC NITRILES

William F. Sager, Cambridge, Mass., assignor to The Texas Company, New York, N. Y., a corporation of Delaware No Drawing. Application January 26, 1948, Serial No. 4,459

10 Claims. (Cl. 260—465.3)

This invention relates to the preparation of organic nitriles. More particularly, the invention relates to the production of unsaturated organic nitriles by the reaction of hydrogen cyanide with a conjugated diolefin.

The process of this invention involves the preparation of unsaturated organic nitriles by the liquid phase reaction of hydrogen cyanide with conjugated diolefins in the presence of a cuprous salt under substantially anhydrous conditions. Anhydrous hydrogen halide or an organic aliphatic halide is advantageously employed as a promoter. Cuprous chloride is the preferred catalyst for effecting the addition of hydrogen cyanide to a conjugated diolefin to prepare an unsaturated organic nitrile.

Organic nitriles are versatile reagents which have a widespread use as intermediates in organic synthesis by virtue of the variety of reactions which they can undergo to form a multitude of organic derivatives. Organic nitriles can be hydrolyzed, hydrogenated and condensed to form acids, amides, amines, imines, aldehydes, ketones and the like. In recent times, unsaturated organic nitriles have found widespread use in the synthetic resin and synthetic rubber industry as co-polymerization agents. The development of a commercially feasible method of preparing unsaturated organic nitriles opens the door to the widespread use of organic acids which are readily formed by the hydrolysis of corresponding unsaturated organic nitriles. The corresponding saturated nitriles can be readily obtained from the unsaturated nitriles produced by the method of this reaction by hydrogenating the unsaturated nitrile under conditions favorable for the hydrogenation of carbon-carbon double bonds.

Heretofore the availability of nitriles has been limited by the fact that they could be synthesized only by expensive and inefficient reactions. The two methods which were most commonly used for the synthesis of nitriles both involve the use of expensive and difficultly attainable starting materials. One of these methods involves the reaction of an alkyl halide or an alkenyl halide with metal cyanide. The other commonly used reaction by which nitriles are prepared is the dehydration of amides at elevated temperatures; this method of preparing nitriles is limited in its application by the availability of organic acids from which the amides may be prepared. Neither of the above two methods for preparing nitriles is readily adapted to commercial development. The present invention provides a method of synthesizing unsaturated nitriles which is readily adaptable to commercial development since the starting materials are readily available chemicals.

We have discovered that unsaturated nitriles are readily prepared by the direct liquid phase reaction of hydrogen cyanide and conjugated diolefin in the presence of a cuprous chloride catalyst under substantially anhydrous conditions. Advantageously, the reaction is effected in the presence of a substantial amount of anhydrous hydrogen halide such as hydrogen chloride. A halogen-containing organic compound such as crotyl chloride may be used as a promoter in place of anhydrous hydrogen halide. The reaction between conjugated diolefin and hydrogen cyanide in the presence of a cuprous salt takes place much more readily and improved yields are obtained when either anhydrous hydrogen halide or a halogen-containing aliphatic organic compound is present as a promoter.

The following equation illustrates the type of reaction which takes place when a conjugated diolefin and hydrogen cyanide are contacted in the liquid phase with a cuprous halide under substantially anhydrous conditions:

$$H_2C=CHCH=CH_2 + HCN \rightarrow CH_3CH=CHCH_2CN$$

The above equation indicates a 1,4 addition of hydrogen cyanide to butadiene which is the mechanism by which the reaction generally takes place; however, in some instances, the addition of the hydrogen cyanide to the conjugated diolefin follows a different course and no limitation of the invention to a 1,4 type of addition is intended.

The conjugated diolefins which may be used in the process of the present invention include acyclic diolefins such as 1,3 butadiene and its homologs and also conjugated cyclic diolefins such as 1,3 cyclopentadiene, 1,3 cyclohexadiene and their homologs. Butadiene, piperylene (1,3-pentadiene) and isoprene (2-methyl-1,3-butadiene) are the most commonly used conjugated diolefins in the process of this invention. Conjugated dienes may be derived from any convenient source such as the thermal decomposition of rubber, thermal and catalytic cracking of petroleum gases and liquids, and the dehydration of glycols. It is preferred to employ relatively pure conjugated diolefins but a mixture of conjugated dienes may be employed in the reaction with subsequent purification of the mixture of unsaturated nitriles thereby formed.

It is feasible to employ inert diluents such as saturated hydrocarbons in order to minimize the formation of undesirable polymerization products. It is also feasible to employ an inert gaseous diluent, such as carbon dioxide, together with hydrogen cyanide, in order to minimize undesirable polymer formation. It should be noted that any diluent, whether it be gaseous or liquid, should be substantially anhydrous.

The catalyst of the present invention comprises a substantially anhydrous cuprous salt with cuprous chloride being the preferred catalyst. Cuprous bromide, cuprous iodide, cuprous fluoride, cuprous cyanide and mixtures thereof are cuprous salts that may be employed. As has been indicated, the cuprous salt is advantageously promoted by the addition of a substantial quantity of promoters such as anhydrous hydrogen halide or an aliphatic halogen-containing compound such as crotyl chloride. The amount of promoter employed is approximately the same whether it is anhydrous hydrogen halide or a halogen-containing organic compound. The promoter is ordinarily employed in mol ratios of promoter to CuX between about 0.2 and 7.0 with mol ratios of 0.5 to 5.0 being preferred; in CuX, X designates a halogen or cyanide atom.

Hydrogen chloride, hydrogen bromide and hydrogen iodide all may be used as promoters for the liquid phase reaction of hydrogen cyanide and a conjugated diene. Hydrogen chloride is the most frequently used promoter because of its ready availability.

Crotyl chloride has been cited as an example of an organic halogen-containing compound which can be employed as a promoter; other alkyl and alkenyl halides such as tertiary-butyl chloride, 1-chloro pentene-2, crotyl bromide, etc., may also be used as promoters for the reaction between hydrogen cyanide and conjugated diolefins.

One method of preparing a cuprous salt for use in the process of this invention is illustrated by the preparation of a cuprous chloride catalyst: an approximately 10 per cent solution of cupric chloride in concentrated hydrochloric acid was refluxed with an excess of copper gauze until the solution is colorless; thereafter the liquid was poured into a large volume of water whereupon a precipitate was formed which was thereafter filtered and washed with water, alcohol and ether; the precipitate comprising essentially cuprous chloride was air dried and used without further purification.

Since cupric salts are not catalysts for the synthesis of unsaturated nitriles by the liquid phase reaction of hydrogen cyanide with conjugated diolefins but rather promote undesirable side reactions such as the production of cyanogen from hydrogen cyanide, it is possible to incorporate a reducing agent in the catalyst in order to preserve the copper catalyst in the cuprous state. Reducing agents which may be employed for this purpose are copper powder, hydroxylamine, hydrazine and the like. In selecting the reducing agent to be incorporated in the catalyst, reducing agents are chosen which do not themselves form stable compounds with the diolefin or with hydrogen cyanide.

The novel reaction of the present invention is ordinarily effected at temperatures between about 100° F. and 500° F. Ordinarily temperatures in the range of about 150 to 300° F. are employed since polymerization of both the diolefin and the hydrogen cyanide is minimized in this temperature range. Above 500° F., there is obtained very little desired product from the liquid phase reaction between HCN and a conjugated diolefin in the presence of a cuprous salt; apparently too many side reactions take place and the catalyst soon loses its activity.

The pressure at which the reaction of a conjugted diene and hydrogen cyanide is effected depends, to a great extent, upon the temperature that is employed; the pressure employed should be sufficient to maintain substantially liquid phase conditions. It is apparent, therefore, that at higher temperatures, higher pressures must be maintained in order to preserve substantially liquid phase conditions. In general, pressures from about atmospheric to about 550 pounds per square inch and ordinarily pressures of 250 to 450 pounds per square inch are sufficient to provide substantially liquid phase conditions.

The reaction may be effected either batchwise or continuously; if batchwise operation is employed, the reactants are introduced into an autoclave which is sealed whereupon the reaction mixture is heated to a predetermined temperature; in continuous type operation, the reactants are passed in liquid phase through a reaction zone which contains the catalyst and which is maintained at prescribed conditions of temperature and pressure.

It is ordinarily preferred to have a molecular excess of the conjugated diolefin in effecting the formation of an organic nitrile from diene and hydrogen cyanide. However, the reaction is successfully effected with equimolecular proportions of conjugated diene and hydrogen cyanide. The use of excess diene takes advantage of the mass action law and also minimizes the polymerization of hydrogen cyanide under the conditions of reaction. Moreover, the employment of an excess of conjugated diene reduces the hazards involved in the recovery of hydrogen cyanide. As a general proposition, the mol ratio of diene to HCN is in the range of about 0.7 to 4 with mol ratios of 1 to 2 being preferred.

The reaction time varies with the type of operation that is employed. Ordinarily, the reaction time is longer in batchwise operation than in continuous operation. In batchwise operation, the reaction time varies from about 1 to 8 hours, but the majority of batchwise operations take 3 to 6 hours. In continuous type operation, space velocities of approximately 0.1 to 10 are employed wherein space velocity represents the weight of hydrocarbon per hour per weight of cuprous salt; preferred space velocities fall within the range of 1 to 5.

An advantage of effecting the reaction of hydrogen cyanide with a conjugated diolefin in the presence of a cuprous salt under substantially anhydrous conditions is that hydrolysis of the resulting unsaturated nitrile is avoided. Under the elevated conditions of temperature and pressure prescribed for reaction in this invention, the resulting unsaturated nitrile would tend to hydrolyze to an unsaturated acid or amide if a considerable concentration of water were present. Effecting reaction under substantially anhydrous conditions prevents hydrolysis of the unsaturated nitrile. Another advantage of effecting the reaction under substantially anhydrous conditions is that hydrolysis and polymerization of hydrogen cyanide itself are decreased.

The reaction products obtained by the addition of hydrogen cyanide to conjugated diolefins in the presence of cuprous salt are recovered by conventional means. One procedure which has proven effective comprises washing the products with a cold dilute alkaline solution so as to remove excess hydrogen halide and unreacted hydrogen cyanide. The organic layer which forms on top of the cold alkaline solution is separated, dried and fractionated; the fractionation is preferentially effected under reduced pressures. The unsaturated nitrile produced by the reaction is obtained by fractional distillation of the alkaline-scrubbed product. Five per cent sodium hydroxide is usually employed as the alkaline wash solution which is maintained cold because otherwise alkaline hydrolysis of the nitrile will take place. It is also possible to remove the catalyst from the product mixture by decantation or filtration; the product mixture is then resolved into components by distillation. Unreacted HCN separated from the product mixture in this fashion can be recycled to the reaction.

In order to illustrate the invention more completely, reference will now be made to the following examples in which hydrogen cyanide is reacted with conjugated diolefins in the presence of a cuprous salt and a promoter such as hydrogen halide or a halogen-containing aliphatic compound to form an unsaturated organic nitrile.

*Example I*

99 grams of cuprous chloride, 540 grams of hydrogen cyandie, 1082 grams of butadiene and 36.5 grams of anhydrous hydrogen chloride were introduced into a steel autoclave at ambient temperature. The mol ratio of butadiene to HCN was about 1 and the mol ratio of HCl to CuCl was about 1. The reactor was then maintained at about 215° F. for 4 hours. 914 grams of 3-pentenenitrile boiling in the range of 127 to 147° F. at 50 mm. mercury pressure were isolated from the product mixture; this amounted to a conversion of about 56 mol percent on the basis of HCN charged and of about 90 mol per cent on the basis of HCN consumed.

*Example II*

12 grams of cuprous chloride, 68 grams of hydrogen cyanide, 136 grams of butadiene and 22 grams of anhydrous hydrogen chloride were introduced into a steel autoclave at ambient temperature. The mol ratio of butadiene to HCN was about 1 and the mol ratio of HCl to CuCl was about 5. The reactor was raised to a temperature of about 212° F. and maintained about that temperature for 12 hours. 67.5 grams of 3-pentenenitrile boiling in the range of 178 to 187° F. at 100 mm. mercury pressure were isolated from the product mixture; this amounted to a conversion per pass of about 30 mol per cent on the basis of HCN charged.

*Example III*

621 grams of butadiene, 22.8 grams of cuprous chloride, 22 grams of anhydrous hydrogen chloride and 67.5 grams of hydrogen cyanide were introduced into a steel autoclave maintained at a temperature of about 212° F. After the reaction mixture had been maintained at this temperature for ½ hour, 67.5 grams of HCN and 24 grams of hydrogen chloride were charged to the reactor. Two additional 67.5 gram charges of hydrogen cyanide were introduced at ½ hour intervals so that a total charge of 270 grams of HCN was charged to the reactor. The mol ratio of butadiene to HCN was 1.15 and the mol ratio of HCl to CuCl was about 5. The reactor was maintained at about 212° F. for 8 hours after the last addition of HCN so that the total reaction time was 9.5 hours. 300 grams of 3-pentenenitrile boiling in the range of 176 to 194° F. at 100 mm. mercury pressure were isolated from the product mixture; this amounted to a conversion of about 37 mol per cent on the basis of HCN charged.

*Example IV*

14.8 grams of cuprous chloride, 204.3 grams of isoprene (2-methyl-1,3-butadiene), 81.1 grams of hydrogen cyanide and 11 grams of anhydrous hydrogen chloride were introduced into a steel bomb at ambient temperature. The mol ratio of isoprene to HCN was about 1 and the mol ratio of HCl to CuCl was about 2. The reactor was maintained at about 215° F. for two hours with shaking, the pressure dropping from about 150 p. s. i. g. to below 100 p. s. i. g. From the reaction product there was obtained 61.7 grams of material boiling in the range 174–181° F. at 50 mm. mercury pressure. Refractive indexes were in the range given in the literature for 4-methyl-3-pentenenitrile and 3-methyl-3-pentenenitrile (molecular refraction observed 29.40, summation value 29.26). The conversion to hexenenitriles was 21.5 mol per cent based on HCN charged with the yield 49 to 65 mol per cent based on HCN consumed. The product was hydrolyzed to an acid of neutral equivalent 124 (theory for hexenoic acids 114).

*Example V*

14.8 grams of cuprous chloride, 204.3 grams of piperylene (1,3-pentadiene), 81.1 grams of hydrogen cyanide, and 3.6 grams of hydrogen chloride were introduced into a steel bomb at ambient temperature. The mol ratio of piperylene to HCN was about 1 and the mol ratio of HCl to CuCl was about 0.67. The reactor was maintained at about 300° F. for about two hours with continuous shaking, the pressure dropping from 300 to 250 p. s. i. g. From the reaction product there was obtained about 28.5 grams of material boiling at 158° F. at 50 mm. mercury pressure. The refractive index was near the literature value for 3-hexenenitrile (molecular refraction 29.16, summation value 29.26). The conversion to hexenenitrile was about 10 mol per cent based on the HCN charged. This nitrile was hydrolyzed to an acid of about the expected neutral equivalent (113.2; theory 114.1).

The process of the present invention is applicable to cyclic conjugated diolefins, as well as the acyclic conjugated diolefins which have been used in the above examples. Thus, cyclo-pentadiene and cyclo-hexadiene undergo reaction in a manner similar to that which has been specifically described for butadiene, piperylene and isoprene.

It is reiterated that other cuprous salts, such as cuprous bromide, cuprous iodide and cuprous cyanide may be used as the catalyst as well as cuprous chloride. Moreover, it is possible to support the cuprous salt on a carrier such as diatomaceous earth, silica gel, alumina, since the anhydrous liquid phase reaction of hydrogen cyanide with conjugated diolefins can be effected in the presence of either a supported or unsupported cuprous salt.

Obviously many modifications and variations of the invention, as hereinbefore set forth, may be made without departing from the spirit and scope thereof and, therefore, only such limitations should be imposed as are indicated in the appended claims.

I claim:

1. The method of preparing unsaturated nitriles which comprises reacting hydrogen cyanide and a conjugated diolefin in the presence of a solid cuprous salt under substantially anhydrous, liquid phase conditions and in the presence of a promoter selected from the group consisting of hydrogen halides and halogen-containing aliphatic compounds.

2. The method according to claim 1 in which the conjugated diolefin is aliphatic.

3. The method according to claim 1 in which the conjugated diolefin is cyclo-aliphatic.

4. The method of preparing unsaturated nitriles which comprises reacting hydrogen cyanide and a conjugated diolefin at a temperature between about 100 and 500° F. in the presence of a solid cuprous salt under substantially anhydrous liquid phase conditions and in the presence of a promoter selected from the group consisting of hydrogen halides and halogen-containing aliphatic organic compounds.

5. The method of preparing unsaturated nitriles which comprises reacting hydrogen cyanide and a conjugated diolefin at a temperature between about 150 and 300° F. in the presence of a solid cuprous salt under substantially anhydrous liquid phase conditions and in the presence of a promoter selected from the group consisting of hydrogen halides and halogen-containing aliphatic organic compounds.

6. The method of preparing unsaturated nitriles which comprises reacting hydrogen cyanide and a conjugated diolefin at a temperature between about 100 and 500° F. and at a pressure sufficient to maintain substantially liquid phase conditions in the presence of a solid cuprous salt under substantially anhydrous liquid phase conditions and in the presence of a promoter selected from the group consisting of hydrogen halides and halogen-containing aliphatic organic compounds.

7. The method according to claim 6 in which the pressure is within the range of 100 to 550 pounds per square inch.

8. The method of preparing unsaturated nitriles which comprises reacting hydrogen cyanide and a conjugated diolefin at a temperature between 100 and 500° F. in the presence of solid cuprous chloride under substantially anhydrous liquid phase conditions and in the presence of a promoter selected from the group consisting of hydrogen halides and halogen-containing organic compounds.

9. The method according to claim 8 in which the promoter is hydrogen chloride.

10. The method according to claim 8 in which the promoter is crotyl chloride.

WILLIAM F. SAGER.

REFERENCES CITED

The following references are of record in the file of this patent:

UNITED STATES PATENTS

| Number | Name | Date |
|---|---|---|
| 2,402,873 | Coffman et al. | June 25, 1946 |
| 2,422,859 | Schulze et al. | June 24, 1947 |
| 2,447,600 | Schulze et al. | Aug. 24, 1948 |
| 2,464,723 | Schulze et al. | Mar. 15, 1949 |
| 2,509,859 | Coffman et al. | May 30, 1950 |

OTHER REFERENCES

Breckpot, Bull. Soc. Chim. Bleg., vol. 39, pp. 462–469 (1930).